United States Patent
Panneton et al.

(12) 
(10) Patent No.: US 6,302,332 B1
(45) Date of Patent: Oct. 16, 2001

(54) METHOD AND APPARATUS FOR SPRAYING TREES, PLANTS, ETC

(75) Inventors: Bernard Panneton, Longueuil; Roger Theriault, Ste-Foy; Benoit Lacasse, St-Jean-sur-Richelieu, all of (CA)

(73) Assignee: Her Majesty the Queen in right of Canada, as represented by the Minister of Universite Laval, Office of Technology Transfer, Vice-rectorat Research Laval Universitie, Saint-Jean-sur-Richelieu (CA)

( * ) Notice: Subject to any disclaimer, the term of this patent is extended or adjusted under 35 U.S.C. 154(b) by 0 days.

(21) Appl. No.: 09/465,706

(22) Filed: Dec. 17, 1999

(30) Foreign Application Priority Data

Jun. 30, 1999 (CA) .................................................. 2277243

(51) Int. Cl.$^7$ ....................................................... A62C 5/02
(52) U.S. Cl. .................................. 239/8; 239/77; 239/124
(58) Field of Search ............................... 239/77, 78, 124, 239/146, 121, 159, 172, 175, 8, 288, 290, 120; 47/1.7; 55/385.1, 440

(56) References Cited

U.S. PATENT DOCUMENTS

| | | |
|---|---|---|
| 3,744,724 | 7/1973 | Caille . |
| 4,026,469 | 5/1977 | Frankel et al. . |
| 4,030,244 | 6/1977 | Tennes et al. . |
| 4,139,156 | 2/1979 | Field et al. . |
| 4,168,798 | 9/1979 | Moore et al. . |
| 4,359,188 | 11/1982 | Moore . |
| 4,865,628 | 9/1989 | Iwanczyk . |
| 4,893,755 | 1/1990 | Keathley . |
| 4,927,080 | 5/1990 | Alsing . |
| 5,002,227 | 3/1991 | Ehrenberg . |
| 5,028,002 * | 7/1991 | Whitford .................................. 239/8 |
| 5,098,018 | 3/1992 | Hadar et al. . |
| 5,214,876 * | 6/1993 | Sukup ...................................... 47/1.7 |
| 5,251,818 | 10/1993 | Manor et al. . |
| 5,372,305 | 12/1994 | Ballu . |
| 5,383,599 | 1/1995 | Zur . |
| 5,522,544 | 6/1996 | Gal . |
| 5,662,267 | 9/1997 | Hulls . |
| 5,740,962 | 4/1998 | Manor et al. . |

FOREIGN PATENT DOCUMENTS

| | | |
|---|---|---|
| 2137118 | 12/1994 | (CA) . |
| 2178932 | 12/1994 | (CA) . |
| 2223444 | 6/1996 | (CA) . |

* cited by examiner

*Primary Examiner*—Lisa Ann Douglas
(74) *Attorney, Agent, or Firm*—Swabey Ogilvy Renault

(57) ABSTRACT

An apparatus (A, A") for spraying treatment product on plants, trees, bushes, etc., and for recovering excess treatment product comprises a fan (30) which conveys pressurized air through a duct (37) located over the plant (9) and vertically distally thereof at a manifold section (38) of the duct (37). The treatment product is supplied with a pump (21) from a reservoir (40) to nozzles (43) of a wet boom (42) extending within or along the manifold duct section (38) and is atomized and incorporated into the air stream exiting from the outlets (39) of the manifold duct section (38) which are oriented towards the plant (9) and an air-liquid separator panel (50) supported proximally of the plant (9) on the frame (13) of the apparatus (A, A"). The manifold duct section (38) can be rotated by a device (15) to compensate air stream deviations due to travel velocity. Treatment product which does not adhere to the plant (9) to be treated is carried by the air stream to the separator panel (50) such as to condense thereat. The treatment product recovered in liquid form is filtered and returned to the spray circuit or accumulated in a separate reservoir. A flexible wind-barrier (60) assists in preventing interference from lateral winds and in recirculating part of the excess treatment product not recovered in the separator panel (50) into the ventilation circuit (37).

27 Claims, 6 Drawing Sheets

METHOD AND APPARATUS FOR SPRAYING TREES, PLANTS, ETC

BACKGROUND OF THE INVENTION

1. Field of the Invention

The present invention relates to a spray apparatus and method for spraying a crop or the like with an agricultural liquid spray and, more particularly, to a mobile spray apparatus adapted for spraying trees and other plants with, for instance, insecticides, herbicides, fungicides, etc., along their entire height.

2. Description of the Prior Art

It is well known to apply various chemical sprays to agricultural and horticultural crops, such as insecticides and fungicides, in order to protect the crops from diseases, insects, and the like. It is also well known to apply such chemical sprays with various spraying apparatuses which, for example, forcibly pass an airborne spray across and through the crop for maximizing the spray coverage on the crop of the spray apparatus.

For instance, U.S. Pat. No. 5,028,002 issued to Whitford on Jul. 2, 1991 discloses a cross-flow spraying assembly in which a fan creates an airstream with a spray liquid being injected in the airstream for spraying a crop. The airborne spray is passed by the airstream across the crop. The assembly includes a discharge hood located on the wheeled vehicle for spraying the liquid outwardly with respect thereto, and the assembly also includes a suction hood located on the other side of the crop, such that the crop is located between the discharge hood and the suction hood, with the suction hood being adapted to recuperate the spray liquid that passes through the crop such that the recuperated spray liquid may be recirculated towards the discharge hood. In this system, suction and pressure are both used, namely on opposite sides of the crop.

U.S. Pat. No. 5,214,876 issued to Sukup on Jun. 1, 1993 discloses an implement for the removal of insects or the like from upstanding plants. The implement is generally used for removing insects or the like from plants using a pressurized stream of air. In Sukup, the circulation of the airflow is reversed with respect to the aforementioned Whitford Patent, in that the system's exhaust directs the airstream through the plant row and towards the motor vehicle and, more particularly, towards a fan intake of the implement, whereby a portion of the exhaust airflow re-enters the intake airflow thereby forming a closed circuit airflow. Also, pesticides or herbicides may be introduced in the closed-circuit airflow for spraying the plants while permitting recirculation of the sprayed liquid which passes through the plants.

Spraying is necessary in order to protect trees and bushes from insect pests or diseases. It is also a preferred means for applying some fertilizers, growth regulators as well as other treatment products.

The typical sprayer is of the blower type and uses a pump serving to convey the spray material to a fan where it is discharged into an air stream in small droplets using a number of nozzles. The air stream assists in breaking up the liquid into small particles. The air stream also acts as a diluent to prevent the small particles from coalescing and carries the fine droplets to the plant from a distance thereof. The coverage is also improved as turbulence in the air is created and the foliage is shaken. In some implementations, the high-speed airstream is also used to atomize the liquid.

In orchards, spraying is conventionally made by a tractor-drawn sprayer including a large tank and a large fan blowing air outwardly and upwardly, creating a large, almost 240-degree radial air blast. This radial pattern results in that the part of the spray missing the target gets over the canopy where it is carried away by stronger winds.

Some trees, for instance apple trees, must be sprayed early in the spring, that is when the trees are devoid of leaves thereby resulting in that most of the treatment product is lost in the environment. Recovery of the spray treatment product could reduce pollution and treatment products costs. The loss of pesticide also results in more time needed for transport and replenishing of tank with water and chemicals. In a context of integrated pest management, amounts of pesticide may be reduced by a better timing of spray treatments in order to optimize their effects. Also, extended possibilities to treat despite non ideal weather conditions could increase treatment efficiency which is related to the timing of the application of the spray treatment. Also, without protection against the wind, the sprayed treatment has more chance to miss the target and cause more drift.

Presently, tower sprayers use ducts and deflectors to redirect the upward part of the air blast in a more horizontal air stream, thus reducing drift at top the trees.

U.S. Pat. No. 5,383,599 issued on Jan. 24, 1995 to Zur uses an inflatable sleeve to redirect radial air blast in an air curtain more parallel to the tree. Cross-flow fans which generate a uniform air curtain are also commercially available.

It is known that smaller droplets result in a better coverage but they are also more prone to drift. The trend in Europe over the last 20 years, and presently in the United States, is to have higher density plantings of dwarf trees, which explains the growing popularity of tunnel sprayers which permit for the use of smaller droplets. In typical tunnel sprayers (such as in Keathley's U.S. Pat. No. 4,893,755 issued on Jan. 16, 1990), the plant is confined by a canopy and the treatment agent is sprayed in this confined zone.

Blowers are also used to circulate air in the hood in order to carry the product to be applied to the central parts of the plants. The recovery is done by impaction or deposition on inner walls and bavettes installed at the bottom of the walls recover liquid which is then pumped back into the reservoir.

The large structure of tunnel sprayers results in that at least one wheel is required on the other side of the plants, thereby reducing the speed of operation.

Another type of tunnel sprayer developed by Hulls (see U.S. Pat. No. 5,662,267 issued on Sep. 2, 1997) uses an atmosphere over saturated with droplets between 30 and 60 microns and the agent is applied to the plants through the process of condensation and coagulation.

However in these systems, the surface of recovery is limited to the walls of the tunnel and bavettes installed at their lower ends, and the mist which remains in the canopy is free to drift after the tunnel has passed over.

Also, in many tunnel sprayers, the droplets' velocity resulting from the air blast makes it difficult to confine the sprayed product.

The principle of drift removal was disclosed by Owanezyk (U.S. Pat. No. 4,865,628 issued on Sep. 12, 1989) who moved a hood over the vineyard with a fan pulling the drift from the hood to a de-mister and an activated charcoal container. This system however did not enjoy the benefits of air-assisted spraying devices for penetrating the canopy and the suction effect rapidly weakens at a distance from the inlet, whereby this principle may hardly be applied to trees of high dimensions.

Recirculating sprayers having a cross-flow configuration (see Withford's U.S. Pat. No. 5,028,002 and Sukup's U.S. Pat. No. 5,214,876, both mentioned hereinabove) blow air charged with liquid treatment through a crop with a suction hood being disposed on the other side to receive part of the overspray which condenses in conduits or recirculates in ventilation.

The portion of the treatment product recovered or recirculated is however limited to the part captured by the suction hood and the inner walls of ducts. Since only the vacuumed air is treated, the rest is lost. Under the effect of entrained air, it becomes impossible to cover all blown air and have a closed circuit. Furthermore, under wind and travel effects, the droplet charged air stream may become deviated from the suction hood, especially for large plants like fruit trees. It becomes therefore necessary to add to the receiving surface of the inlet suction hood.

An example of a passive collecting device is found in Australian Patent Specification No. 50424/79 (U.S. Pat. No. 4,168,798 issued on Sep. 25, 1979 to Moore et al.), wherein "solid stream" spray nozzles direct a spray to fibrous collector panels from which the liquid is recirculated. In the case of an air stream charged with droplets, such a device should let airflow through easily while condensing excess spray treatment. A plain absorbing surface would deviate the air stream around and excess spray treatment would get lost as well.

SUMMARY OF THE INVENTION

It is therefore an aim of the present invention to provide a new apparatus for spraying trees, plants, bushes and the like with various sprayed treatment products, such as insecticides, herbicides, fungicides, etc.

It is also an aim of the present invention to provide a spray apparatus adapted for passive recuperation of the excess spray liquid having passed through the plants, or the like, to be treated. Typically, the so-recovered treatment products are recirculated and re-sprayed onto the plants.

It is a further aim of the present invention to provide an at least partly flexible spray dispensing boom adapted to deflect upon encountering an obstacle such as to prevent a breakage of, or damage to, the spray apparatus, or to the plants.

It is a still further aim of the present invention to provide a spray apparatus having an air-liquid separator of adjustable dimension and orientation for a more efficient recuperation of the recirculated spray liquid.

It is a still further aim of the present invention to provide a spray apparatus having a spraying boom which can be adjusted to compensate for travel speed and longitudinal wind.

It is a still further aim of the present invention to provide a spray apparatus provided with a wind barrier to diminish the interfering effect of lateral winds on the spray application.

It is a still further aim of the present invention to provide a new method for spraying various liquids on plants, trees, bushes, and the like.

The present invention relates to agriculture field spraying systems, devices and apparatuses for spraying pest control products, fertilizers as well as other treatment products onto plants, trees, bushes, etc. The invention is particularly concerned with improving recovery of excess spray treatment and with improving the effectiveness of the spray application under windy conditions.

The spray apparatus of the present invention for spraying treatment product on plants, trees, bushes, etc., and for recovering excess treatment product comprises a fan which conveys pressurized air through a duct extending over the plant and then vertically downward on a distal side of the plant, at a manifold section of the duct. The treatment product is supplied with a pump from a reservoir to nozzles of a conduit extending along (or within) the manifold duct section and is atomized and incorporated into the air stream exiting from the outlets of the manifold duct section which are oriented towards the plant and an air-liquid separator panel supported proximally of the plant on the frame of the apparatus. The manifold duct section can be rotated by a device to compensate air stream deviations due to travel velocity and/or wind. Treatment product which does not adhere to the plant to be treated is carried by the air stream to the separator panel such as to condense thereat. The treatment product recovered in liquid form is filtered and returned to the spray circuit or accumulated in a separate reservoir. A flexible wind-barrier assists in preventing interference from lateral winds and in recirculating part of the excess treatment product not recovered in the separator panel into the ventilation circuit.

The apparatus allows for spraying of smaller droplets while reducing the drift and associated pollution.

The apparatus can be adapted to treat two rows of trees, plants or bushes, at the same time to increase field capacity and productivity.

According to the present invention, a method for spraying of trees or bushes and recovering excess treatment product comprises creating an air stream with fan means; incorporating an atomized treatment product with nozzle means into the air stream; passing the product-charged air stream through the plant to be treated with the treatment product from a distal side of the plant towards a proximal side thereof; passively separating excess droplets of treatment product from the air stream leaving the treated plant with a gas-liquid separator; and recovering the excess treatment product and possibly returning it to the spray circuit when appropriate.

Therefore, in accordance with the present invention, there is provided a spraying apparatus for applying a treatment product on vegetation, comprising a support frame, a fan mounted on said support frame and on a proximal side of the vegetation, a conduit mounted to said support frame and having an inlet and an outlet, said conduit being adapted to extend above the vegetation and to convey air by way of said fan from said inlet to said outlet thereof such that an air stream exiting from said outlet on a distal side of the vegetation is directed towards said support frame, a spray system adapted to inject a treatment product in the air stream, and a passive treatment product recuperation system mounted at said proximal side, whereby the treatment product and the air stream are discharged at said distal side and towards the vegetation with at least a large portion of overspray emerging from the vegetation on said proximal side being passively collected by said recuperation system.

Also in accordance with the present invention, there is provided a spraying apparatus for applying a treatment product on vegetation, comprising a support frame, a fan mounted on said support frame and on a proximal side of the vegetation, a conduit mounted to said support frame and having an inlet and an outlet, said conduit being adapted to extend above the vegetation and to convey air by way of said fan from said inlet to said outlet thereof such that an air stream exiting from said outlet on a distal side of the vegetation is directed towards said support frame, a spray system adapted to inject a treatment product in the air stream, a treatment product recuperation system mounted at said proximal side, and a wind barrier mounted on said support frame for diminishing a wind effect on the air stream and treatment product, whereby the treatment product and the air stream are discharged at said distal side and towards the vegetation with at least a large portion of overspray emerging from the vegetation on said proximal side being collected by said recuperation system.

Further in accordance with the present invention, there is provided a spraying apparatus for applying a treatment product on vegetation, comprising a support frame, a fan mounted on said support frame and on a proximal side of the vegetation, a conduit mounted to said support frame and having an inlet and an outlet, said conduit being adapted to extend above the vegetation and to convey air by way of said fan from said inlet to said outlet thereof such that an air stream exiting from said outlet on a distal side of the vegetation is directed towards said support frame, a spray system adapted to inject a treatment product in the air stream, said conduit comprising an overhead section extending outwardly from said support frame and adapted to extend above the vegetation and, on said distal side, a flexible manifold section extending downwardly from said overhead section and opposite the vegetation, said spray system comprising a boom extending adjacent said manifold section and capable of bending such that said manifold section and said boom are both capable of deflection upon encountering an obstacle, whereby the treatment product and the air stream are discharged at said distal side and towards the vegetation respectively from said boom and said manifold section.

Still further in accordance with the present invention, there is provided a spraying method for applying a treatment product on vegetation, comprising:

a) creating an air stream;

b) providing a treatment product;

c) introducing the treatment product in the air stream;

d) passing the air stream and the treatment product from an upstream side of the vegetation through the vegetation; and e) passively intercepting and collecting at least some of the excess treatment product on a downstream side of the vegetation.

Still further in accordance with the present invention, there is provided a spraying apparatus for applying a treatment product on vegetation, comprising a support frame, a fan mounted on said support frame and on a proximal side of the vegetation, a conduit mounted to said support frame and having an inlet and an outlet, said conduit being adapted to extend above the vegetation and to convey air by way of said fan from said inlet to said outlet thereof such that an air stream exiting from said outlet on a distal side of the vegetation is directed towards said support frame, a spray system adapted to inject a treatment product in the air stream, an orientation of said outlet being adjustable such as to vary a discharge direction of the air stream from said outlet, whereby the treatment product and the air stream are discharged at said distal side and towards the vegetation.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
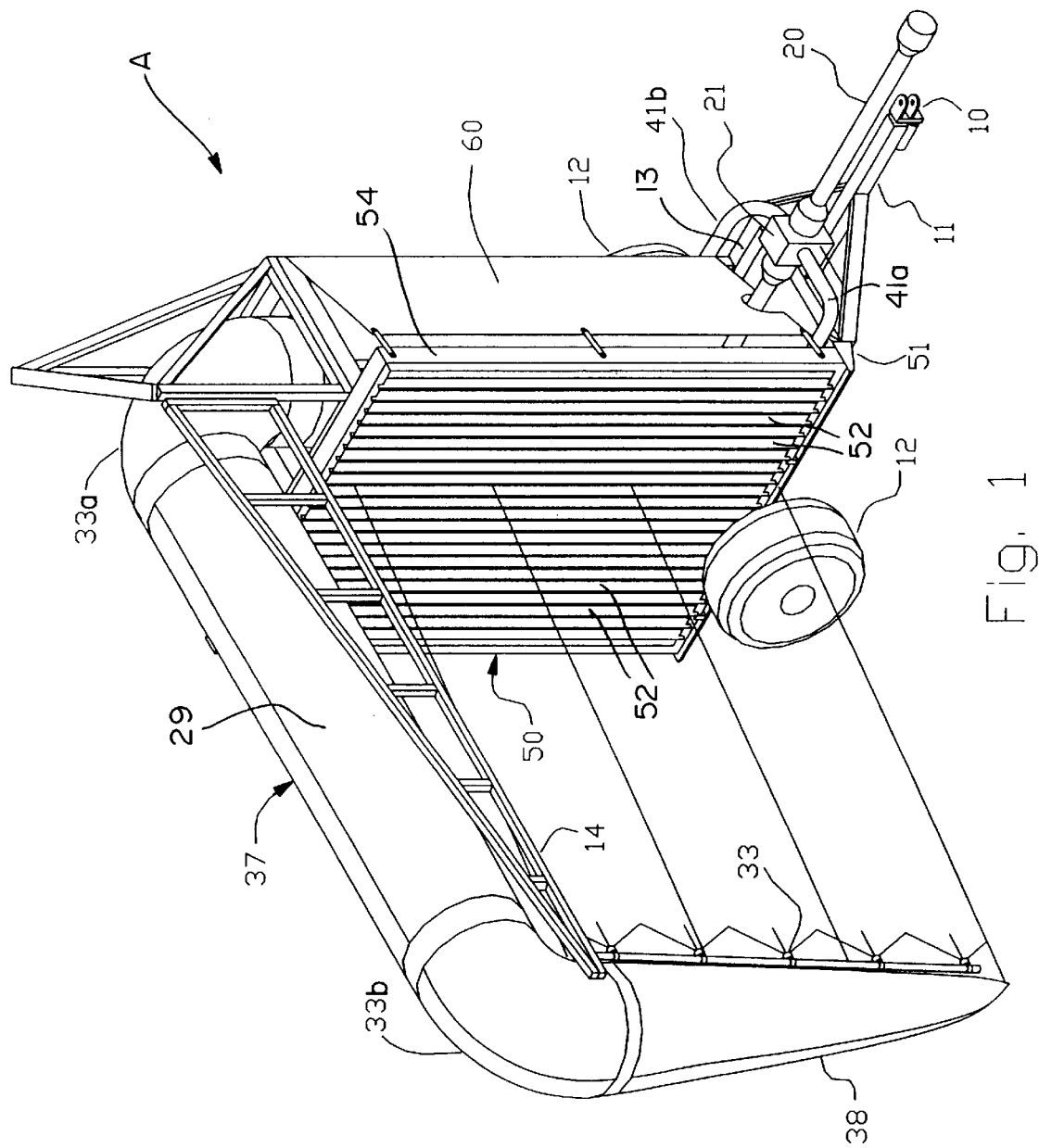
FIG. 1 is a schematic isometric view of a spray apparatus in accordance with the present invention.
Figure 2:
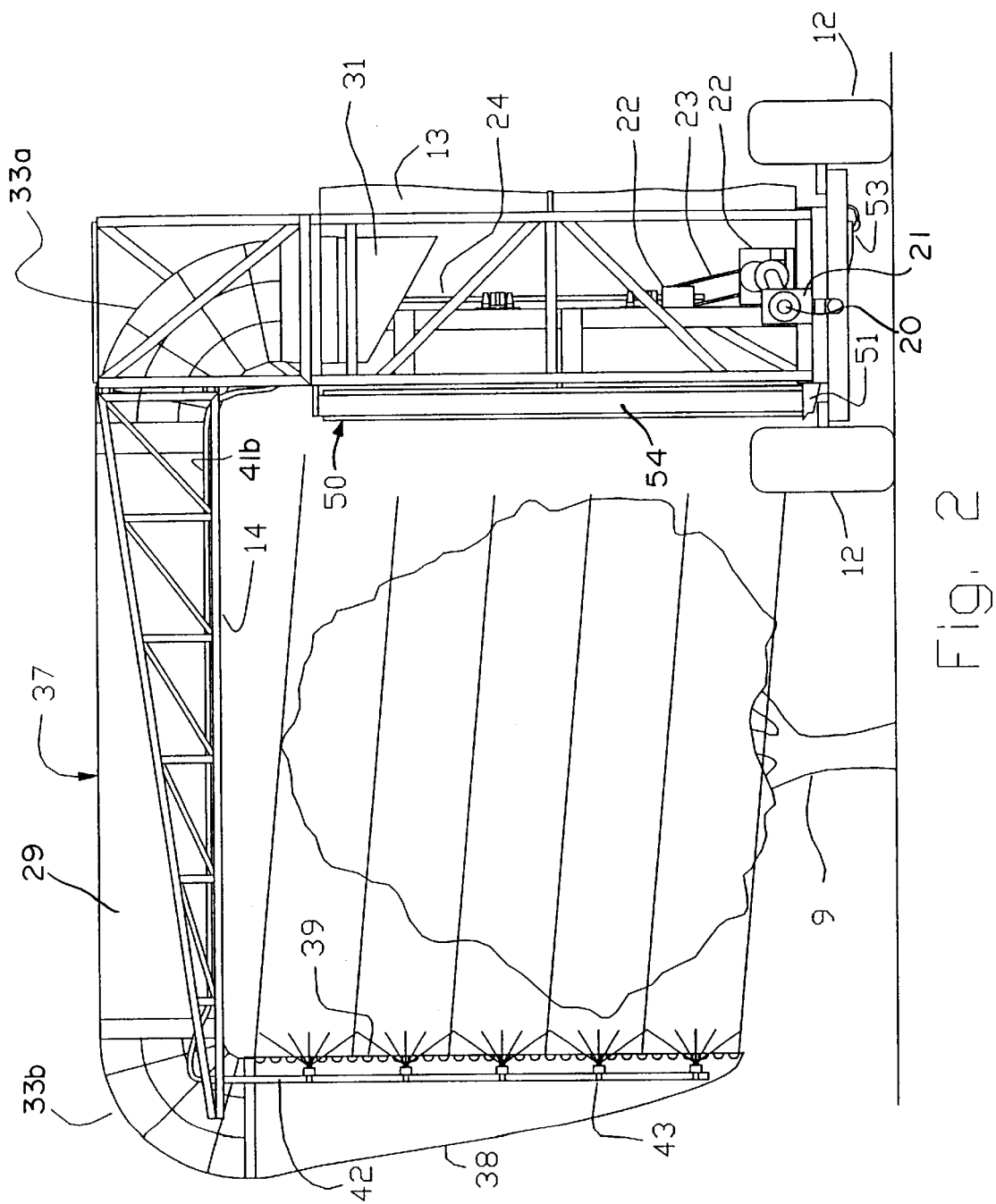
FIG. 2 is a front elevational view of the spray apparatus of FIG. 1.
Figure 3:
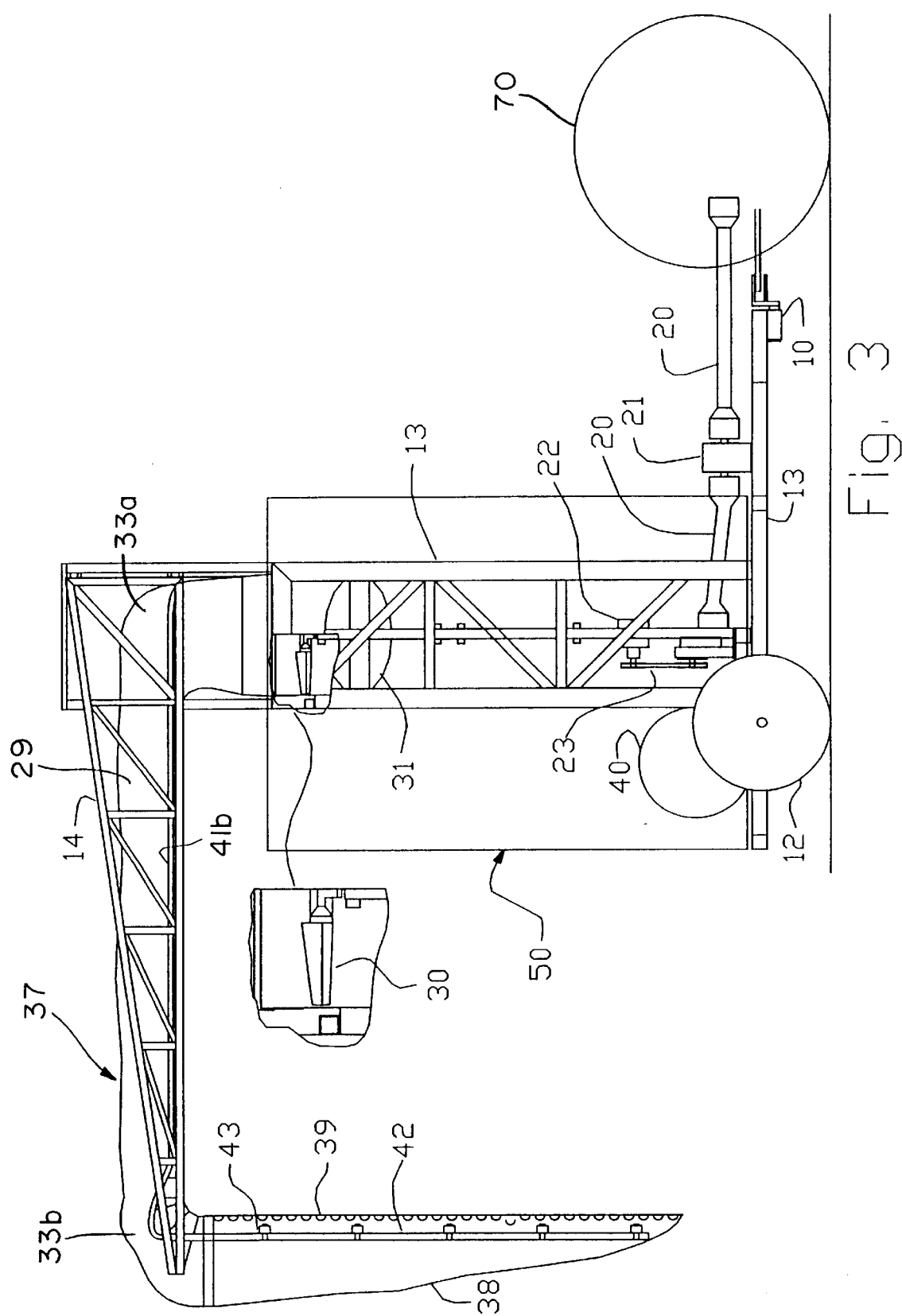
FIG. 3 is a schematic side elevational view of the spray apparatus of FIG. 1, shown in a transport position thereof.
Figure 4:
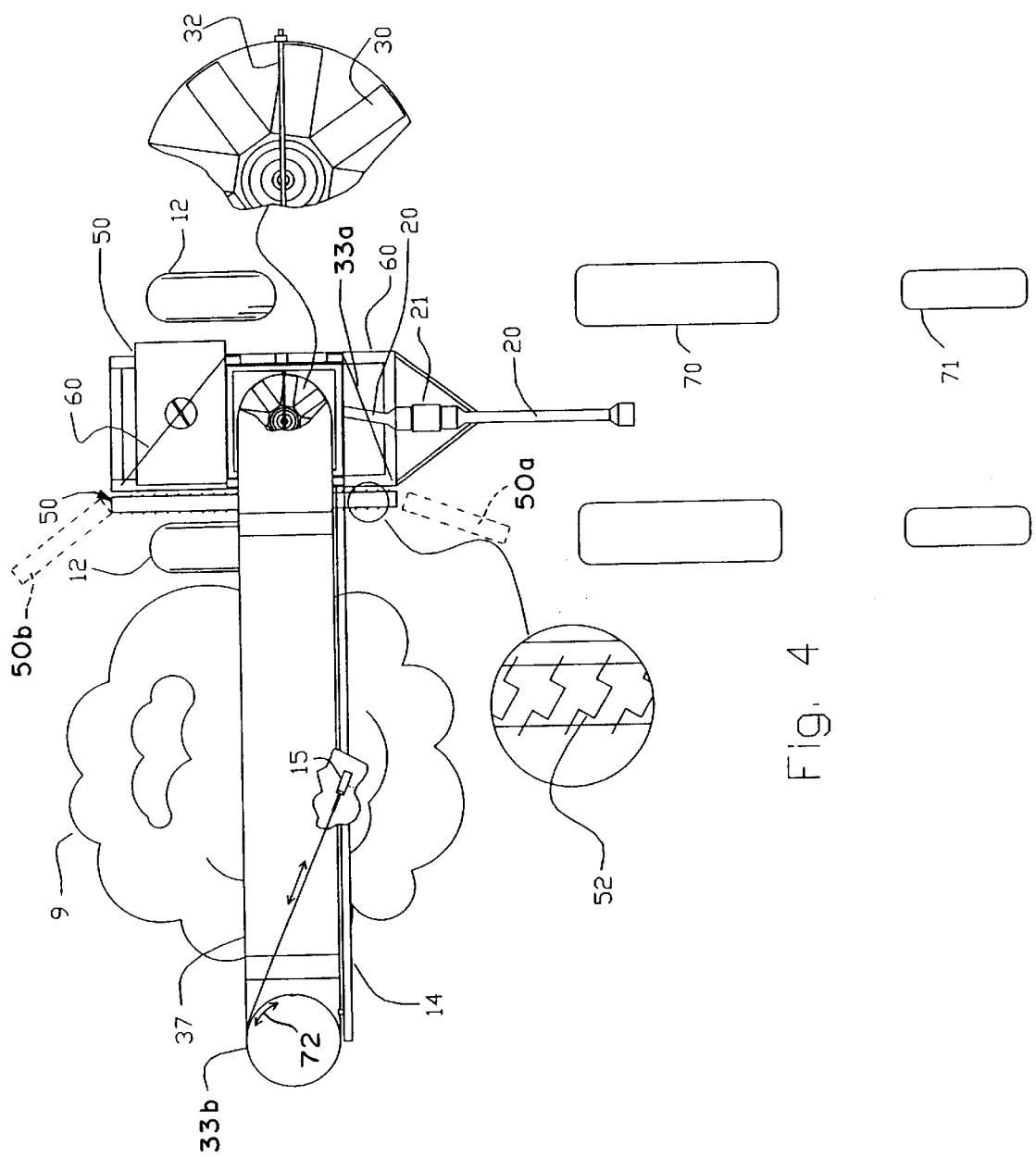
FIG. 4 is a schematic top plan view of the spray apparatus of FIG. 1, shown in a working position thereof.
Figure 5:
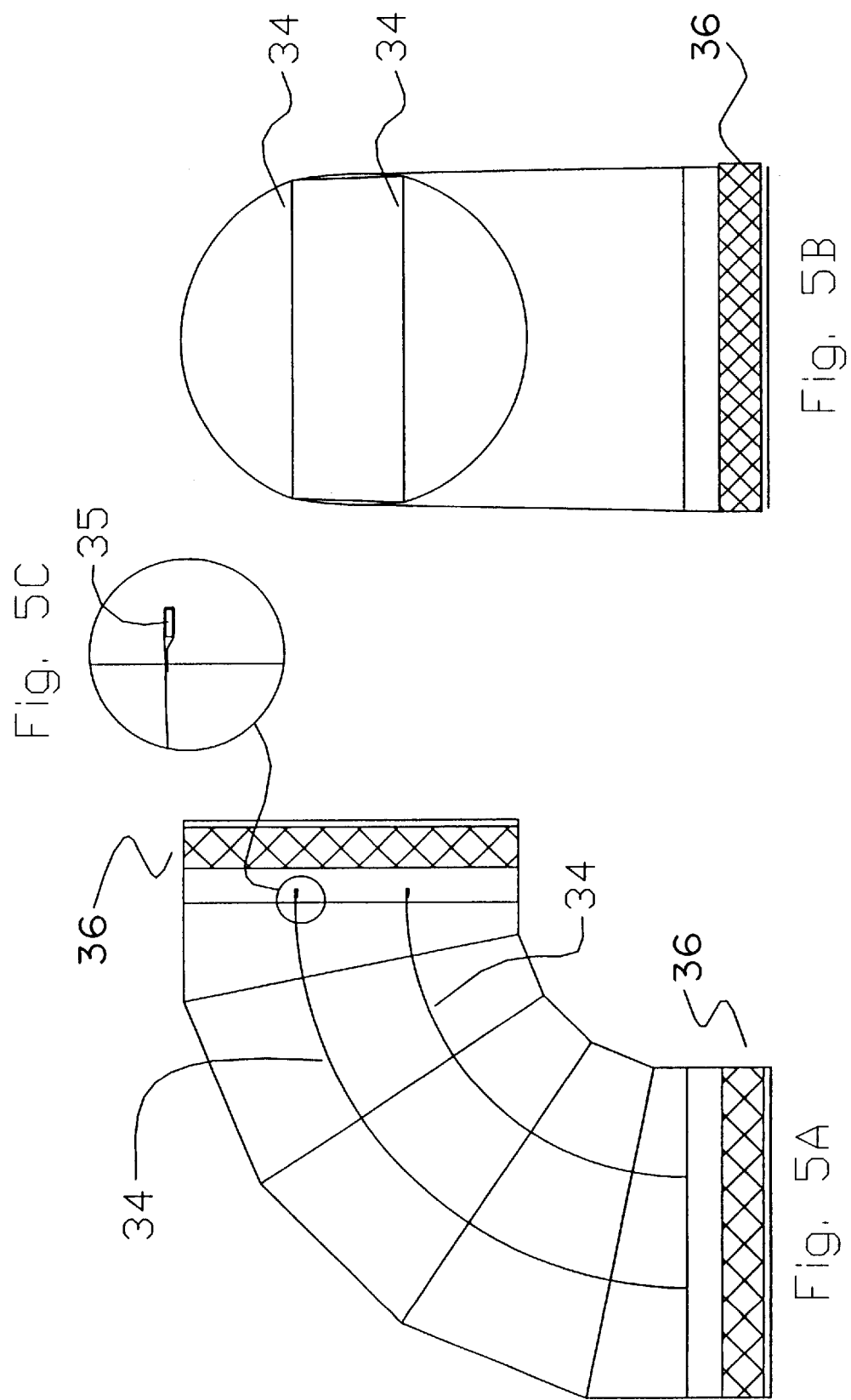
FIGS. 5A and 5B are respectively side and front elevational views of an elbow of the spray apparatus of FIG. 1.
FIG. 5C is an enlarged detail view of part of the elbow of FIG. 5A.

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

To overcome the problems associated with prior art agricultural spray systems, the present invention proposes a method and an apparatus for spraying arborescent plants and bushes with a treatment product and for recovering excess treatment product.

The method basically comprises the steps of:

(a) creating an air stream with a blower mechanism;

(b) incorporating an atomized treatment product with nozzles into the air stream;

(c) passing the product-charged air stream through plants, or the like, to be treated with the treatment product;

(d) on the other side of the plants, separating excess droplets of the treatment product from the air stream emerging from the treated plants with a gas-liquid separator; and (e) recovering and the excess treatment liquid and possibly returning it to the spray circuit.

The present method and apparatus allow for improved recovery of excess treatment product while maintaining a good coverage of the plant with the treatment product. The excess treatment product may be recovered for recirculation, as mentioned hereinabove, or for ulterior disposal thereof.

The present invention overcomes the problems associated with the prior art recirculating spraying systems for trees and bushes by using air-pervious recovery panels of desired surface independently of any vacuumed airflow. The support of the weight of these recovery panels by the chassis and their passive mode of action permit much larger recovery surfaces thus improving recovery performances.

The manifold can be oriented to allow the airstream direction to be adjusted in view of the vehicle's travel speed travel speed and longitudinal wind.

Protection from the wind, as in "tunnel sprayers", is offered by the wind-barrier while the light inflatable ducts and associated structure permit greater travel speeds. It allows for the use of smaller droplets while reducing the drift and associated pollution.

The use of flexible guiding vanes in the elbows allows for a reduction in the power required and results in obtaining sufficient air velocities at the manifold outlet for crossing the plant to be treated and creating turbulence.

The combined use of an inflatable manifold and a flexible wet spray boom, which can both bend, protects this structure in the event that it encounters an obstacle and prevents damage thereto upon operator errors.

FIG. 1 illustrates a spray apparatus A in accordance with the present invention which comprises a frame 13 mounted on a chassis 11 equipped with wheels 12 and adapted to be attached with hitch 10 to a tractor or other motorized vehicle, the front and rear wheels 71 and 70, respectively, of which being schematically illustrated in FIG. 4. A horizontal boom 14 is rotatably mounted to the frame 13 for pivoting about a vertical axis and along a horizontal plane and is adapted to extend in a substantial horizontal direction over a row of trees 9 (see FIGS. 2 and 4), bushes, or the like, to be treated.

In its working position, the boom 14 is generally held substantially perpendicular to the displacement direction of the apparatus A, as seen in FIGS. 1 and 2, whereas it is folded to its storage position shown in FIG. 3 for non operational travel purposes (where the boom 14 is generally aligned with the direction of travel of the spray apparatus A). A hydraulic manifold cylinder 15 is adapted to rotate the manifold section 38 along arrows 72 and with respect to elbow 33*b* for selectively adjusting the orientation of the outlets 39 and nozzles 43. This adjustment allows for aiming the air flow and spray towards the separator panel 50 and so compensating for various factors, e.g. travel speed of vehicle, wind, etc. Other means for adjusting the aim of the air flow and spray towards the separator panel 50 could be used, such as rotating, or translating back and forth, the boom 14 and to maintain it in a set position. The cylinder 15 is connected by hydraulic hoses on hydraulic plugs (not shown) located, usually, at the back of the tractor such that the manifold section 38 can be operated from inside the tractor's cab.

A rotating shaft 20 attached to a tractor's utility standard, 540 rpm, PTO, drives a pump 21 and a fan impeller 30 (the latter being located within impeller housing 31 at the entrance of a proximal first elbow 33*a* of an inflatable overhead duct 37, as seen in FIGS. 2 to 4) by means of a collection of belts and pulleys 23, gearbox 22 and auxiliary shafts 24.

Either one of both the pump 21 and the fan impeller 30 could be provided with an independent hydraulic motor or flexible shafts. The present preferred solution permits driving of the pump 21 and of the impeller 30 via the power takeoff of a tractor, thereby requiring less maintenance and lowering the spray apparatus' cost.

The impeller 30 is adapted to blow air through the overhead duct 37 which includes the aforementioned proximal first elbow 33*a*, a straight horizontal section 29, a distal second elbow 33*b* and a downwardly extending manifold section 38 which defines a series of substantially vertically aligned outlet openings 39 on a side thereof facing towards an air-liquid separator recovery panel 50 located on the frame 13 and thus facing towards the plant 9. The overhead 37 is made of fluid impervious material.

On the frame 13, there is mounted a reservoir 40 capable of holding the treatment product, generally pesticides or fungicides. The pump 21 is adapted to convey with a series of flexible conduits 41*a* and 41*b* the treatment product from the reservoir 40 to a wet boom 42 which extends vertically along the manifold section 38 of the overhead duct 37, as best seen in FIGS. 2 and 3. A filter is provided between the reservoir 40 and the pump 21. The wet boom 42 is provided with a series of nozzles 43 distributed at spaced locations along the wet spray boom 42 and through which the treatment product is sprayed. The pressure and flow control of the treatment product in the flexible conduits or tubes 41*a* and 41*b* is adjusted by a plurality of valve means (not shown).

The size of the droplets which result from a mixture of the treatment product being ejected through the nozzles 43 and incorporated to the pressurized air provided in the overhead duct 37 and coming out of the outlet openings 39 is adjustable by means of the pressure of the treatment product in the line and the selection of the nozzles 43. It is to be understood that the wet spray boom 42 is in fluid connection with the pump 21. Corrosion resistant flexible hoses are preferred for fluid connection of the reservoir 40 to the nozzles 43. The wet spray boom 42 may be made of flexible material (e.g. PVC) and/or may be additionally provided with a mechanical hinge so that it will bend with the inflatable manifold section 35 of the overhead duct 37 when encountering an obstacle and then return to its original position thereafter.

The gas-liquid separator panel 50 comprises aluminum perforated and profiled sheets 52 (see inset in FIG. 4) placed side-by-side in a frame 54. The sheets 52 are preferably vertically or obliquely disposed within the frame 54. In FIG. 4, the sheets 52 are shown in a vertical orientation and at an angle with respect to the air curtain. This passive recovery device allows a wider recovery surface than in cross-flow sprayers where it is limited to the suction hood and only the droplets in the vacuumed air are recirculated. Furthermore, since the panels of the present invention allow air to go through with only few restrictions, the air stream and the airborne droplets are not deviated.

The choice of creating the air stream from the distant side of the plants is motivated by the fact that larger recovery surfaces can be achieved if the air-liquid separator panel 50 is mounted on the frame side.

The separator panel 50 may be provided with front and rear auxiliary panel sections 50*a* and 50*b* (see phantom lines in FIG. 4), angularly adjustable with respect to the plane of the main panel 50 for increased recovery of the excess treatment product. The angular disposition of the panel sections 50*a* and 50*b* may serve as guides for recirculating air not flowing through the separator panel 50, in a vortex shaped flow. The panel sections 50*a* and 50*b* also include gutters or channels at their lower ends for recovery of the treatment product and conveying same to the sink 53.

Many other configurations are commercially available but, for cost reasons, a simpler configuration is preferred for recovering actually 80% of the spray treatment product still present in the air stream. This configuration also presents ease of cleaning as many debris like leaflets or petals may clog the more sophisticated conventional panels during their operation. The number and dimensions of these panels can be modified to further increase the recovery surface.

A portion of the airborne droplets, that is part of the fine aerosol not intercepted by the gas-liquid separator panel 50, may be recirculated in the ventilation circuit, i.e. through the duct 37.

Channels 51 are located at the bottom of the panel 50 for receiving the recovered treatment product separated by the profiled sheets or grating 52 of the air-liquid separator panel 50. The recovered treatment product then flows into a sink 53 located at the bottom of the chassis 11, the sink 53 also recovering the portion of the treatment product that has condensed on the frame 13, on the inner side of a wind barrier 60 and in the fan impeller 30 of the spray apparatus A. A recirculation pump mounted on the frame 13 returns the recovered treatment product from the sink 53 to the main reservoir 40 or to an independent reservoir (not shown), with a filter being provided between the sink 53 and the recirculation pump. The independent reservoir can be mounted atop the main reservoir 40 and can, for instance, flow by gravity therein.

A pump coupled with one of the auxiliary shafts could be used to convey the recovered product from the sink 53 to the reservoir 40, but preferably a small pump (powered with a 12V source) located near the bottom of the sink 53 is used as the recirculation pump as it does not have to be charged and a 12V source can usually be found on tractors.

The aforementioned flexible wind barrier 60 is mounted on the frame 13 and on the separator panel 50 to prevent lateral winds from interfering with the droplet-charged airstream.

Although the airflow generating means may comprise hydraulically or electrically actuated airblower means arranged along the vertical boom and held up and suspended on the other side of the plants, it is preferable to mount the blower means, e.g. the fan impeller 30, on the frame of the spray apparatus A and extend air guiding ducts in order to keep the boom as light as possible. A lighter boom will reduce stress on hinges and on the frame when encountering bumps during operation.

The blower means are thus preferably mounted on the frame and preferably comprise, as described hereinabove, the axial fan 30 oriented upwardly and mounted in the upper part of the chassis in order to recirculate parts of the mist not condensed in the gas-liquid separator 50.

The fan housing 31 may be made of galvanized steel and is preferably mounted separately on the frame in order to make it lighter, simplify its design and reduce vibrations which may be transmitted thereby. The housing 31 is preferably further provided with a sink to recover droplets condensed on the fan blades and dripping from its bottom edge.

At the top of the fan housing 31, there is fixed a support shield, e.g. at least one bar 32 (see inset in FIG. 4), to prevent the flexible overhead duct 37 from folding inward and possibly come in contact with the blades of the fan impeller 30. A grid may be, for instance, used instead of the bar(s) 32.

FIGS. 5A to 5C show a more detailed view of the elbows 33*a* and 33*b* which each comprise flexible guiding vanes 34 for reducing pressure losses. Resilient flat bars 35 are located on the border line of the guiding vanes 34 to keep them straight. Also the guiding vanes 34 are slightly shorter than the width of the elbow 33*a*/33*b* for a given distance from the bottom (see FIG. 5B) so that, when the elbow 33*a*/33*b* is inflated under the static pressure, the guiding vanes 34 are extended and held straight. Guiding vanes deformed under dynamic pressure exerted by the air would increase instead of lessen the pressure losses in the elbows. These simple air guiding means permit to reduce head losses, the associated required power from the tractor and the size and price of the power transmission components.

It is preferable to use large inflatable ducts for transporting air. For a given volume, the velocity is lowered and thus, pressure losses through the circuit are reduced. The parts of the overhead duct 37 may all be fixed together; however, it is preferable to provide duct subsections which are detachably mounted together, for instance with loop-and-hook fasteners 36, also called Velcro™, as such an assembly is easier to clean, repair or replace. Flexible water impervious material is preferred for the inflatable ducts and it may be sewn according to the desired shape. With respect to rigid ducts, the inflatable duct used in the spray apparatus A (see the overhead duct 37) present an invaluable advantage in matter of weight and cost and the boom can be alleviated.

With the present arrangement, the droplet-charged air stream emerging from the manifold duct section 38 and the wet boom 42 progresses through the foliage of the tree (plant, bush, etc.) from one side thereof to its opposed other side thereby exposing all of the foliage of the tree to the droplet-charged air stream.

Gas-liquid separators are current in industrial processes for purifying air from liquids in suspension. Embodying the present air-liquid separator panel 50 in the apparatus A renders possible a new configuration in agricultural sprayers for trees or bushes with improved proportion of treatment product overspray recovery, as exemplified herein by the apparatus A.

Since the spraying apparatus A herein presented is adequate for spraying dwarf trees, anyone skilled in the art will understand that other configurations than that shown in FIGS. 1 to 5 can be utilized for example to adapt for treating bushes, vines and smaller trees, which will certainly result in even better recovery rates for the shortest distance between manifold outlets (39) and gas-liquid separator (50).

For narrower and smaller plants, the adaptation could mainly lie at the level of dimension changes and sizing of the main components of the spray apparatus A. Such an apparatus for treating bushes, vines and smaller trees would be lighter and smaller. Another possible embodiment would include a frame provided with connecting elements for mounting the agricultural sprayer on the three-point of the tractor. The reservoir 40 may then be mounted somewhere else on the tractor, e.g. at the front thereof.

Another preferred embodiment which could allow for the treatment of fruit trees and vines with the same apparatus would simply replace the boom 14 and the straight duct section 29 of the inflatable duct 37 by shorter ones while changing the manifold 38 with another exempt of outlets at its upper section.

The present spray apparatus A could also be provided with a mechanism for varying the elevation (i.e. the vertical position) of the boom 14, and thus the position of the air outlets 39 and nozzles 43. The span of the overhead duct 37 may be adjusted, for instance, by providing the straight duct section 29 with telescoping sub-sections.

A plant detection system may be provided on the spray apparatus A to interrupt the flow of treatment product to the nozzles 43 when no vegetation is present within the overhead duct 37. This detection system would preferably include at least one emitter and one receiver provided on one and the other of the proximal and distal sides of the spray apparatus A and working together in a line of sight mode. The emitter (or receiver) located on the distal side should be forwardly off set from the receiver (or emitter) provided on the wet boom 42 or on the manifold section 38 to provide an adequate delay for the activating, or de-activating, of the spray activity of the nozzles 43. Such a detection system reduces treatment product losses.

The spray apparatus A may also be provided with additional nozzles located at one or both of the proximal and upper sides of the vegetation. The additional nozzles may be fed with treatment product with the same conduit system feeding the distal nozzles 43, or with a different conduit system. Treatment product dispensed by these additional nozzles must be projected with sufficient momentum to reach and sufficiently penetrates the vegetation as these sprays are not air-assisted (as are those of the nozzles 43 with the air emitted through outlets 39). Therefore, at least one such additional nozzle is provided above the vegetation for downwards dispending of the treatment product thereon. Also, at least one such additional nozzle is provided on the proximal side of the apparatus A for dispensing the treatment product towards the proximal side of the vegetation. These additional nozzles are oriented such that the treatment product penetrates the vegetation in front of the air curtain created by the outlets 39 and such that excess treatment product from these additional nozzles is entrained by the air curtain towards the separator panel 50.

Figure 6:
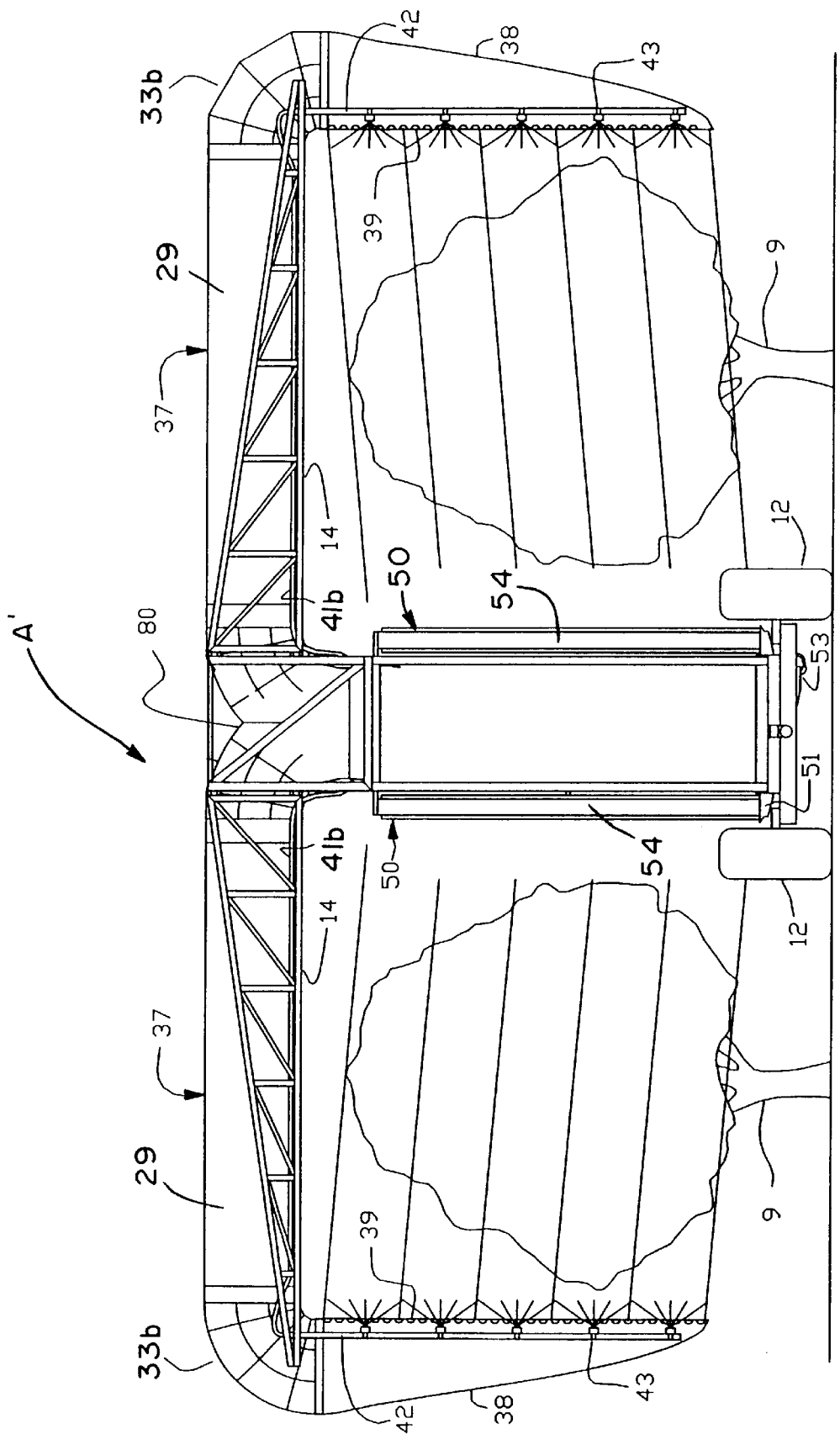
FIG. 6 is a front elevational view of a second embodiment of a spray apparatus in accordance with the present invention adapted for treating simultaneously two rows of plants, trees, bushes, etc.

Now referring to FIG. 6, there is shown a variant spray apparatus A' also in accordance with another preferred embodiment of the invention which is designed for applying the spray treatment product on two rows of trees, plants, etc., at the same time. A Y-shaped divider duct 80 is clamped on the downstream side of the outlet of the fan impeller 30 and is connected with two horizontal straight duct sections 29 and their respective elbow 33*b* and manifold section 38. The divider duct 80 basically embodies two oppositely directed elbows, such as elbow 33*a* of apparatus A of FIGS. 1 to 5. The Y-shaped divider duct 80 may comprise guiding vanes that can be sewn with the outlet straight duct 29. Guiding vanes (similar to the vanes 34 of the apparatus A of FIGS. 1 to 5) with flat bars (e.g. flat bars 35 of apparatus A) are also provided to reduce head losses.

The inlet surface is equal or a slightly superior to the total surface of the two outlets of the Y-shaped divider duct 80.

While a preferred embodiment of the present invention has been illustrated and described herein, it will be appreciated that various changes and modifications as may be therein without departing from the spirit of the invention as defined by the scope of the appended claims.

We claim:

1. A spraying method for applying a treatment product on vegetation, comprising:
   a) creating an air stream;
   b) providing a treatment product;
   c) introducing the treatment product in the air stream;
   d) passing the air stream and the treatment product from an upstream side of the vegetation through the vegetation; and
   e) passively intercepting and collecting at least some of the excess treatment product on a downstream side of the vegetation.

2. A spraying method as defined in claim 1, wherein after step e), there is provided step f) of returning to step b) the treatment product collected in step e).

3. A spraying method as defined in claim 1, wherein a position of at least one outlet for the air stream in step c) located on said downstream side is adjustable such as to vary a discharge direction of the air stream from said outlet.

4. A spraying method as defined in claim 3, wherein the air stream is created on a proximal side of the vegetation and is conveyed over the vegetation such as to be delivered in step c) on a distal side of the vegetation, through the vegetation in step d) with step e) occurring at said proximal side.

5. A spraying method as defined in claim 3, wherein at least one wind deflector is provided for diminishing the possible effect of contrary winds on the air stream in at least one steps c) to e).

6. A spraying method as defined in claim 3, wherein in step e), there is used a gas-liquid separator for separating excess treatment product from the air stream and collecting the former by gravity at the bottom of said gas-liquid separator.

7. A spraying method as defined in claim 6, wherein treatment product collected on other structural components than said gas-liquid separator is at least partly recuperated for re-use in step c).

8. A spraying method as defined in claim 3, wherein part of the air stream and treatment product having passed through the vegetation is introduced in the air stream of step a).

9. A spraying method as defined in claim 3, wherein nozzles for delivering treatment product in step c) are located adjacent to outlets for the air stream of step c).

10. A spraying apparatus for applying a treatment product on vegetation, comprising a support frame, a fan mounted on said support frame and on a proximal side of the vegetation, a conduit mounted to said support frame and having an inlet and an outlet, said conduit being adapted to extend above the vegetation and to convey air by way of said fan from said inlet to said outlet thereof such that an air stream exiting from said outlet on a distal side of the vegetation is directed towards said support frame, a spray system adapted to inject a treatment product in the air stream, an orientation of said outlet being adjustable such as to vary a discharge direction of the air stream from said outlet, whereby the treatment product and the air stream are discharged at said distal side and towards the vegetation.

11. A spraying apparatus as defined in claim 10, wherein a treatment product recuperation system is mounted at said proximal side such that at least a large portion of overspray emerging from the vegetation on said proximal side is collected by said recuperation system with said orientation of said outlet being set for improved recovery of said overspray by said recuperation system.

12. A spraying apparatus for applying a treatment product on vegetation, comprising a support frame, a fan mounted on said support frame and on a proximal side of the vegetation, a conduit mounted to said support frame and having an inlet and an outlet, said conduit being adapted to extend above the vegetation and to convey air by way of said fan from said inlet to said outlet thereof such that an air stream exiting from said outlet on a distal side of the vegetation is directed towards said support frame, a spray system adapted to inject a treatment product in the air stream, and a passive treatment product recuperation system mounted at said proximal side, whereby the treatment product and the air stream are discharged at said distal side and towards the vegetation with at least a large portion of overspray emerging from the vegetation on said proximal side being passively collected by said recuperation system.

13. A spraying apparatus as defined in claim 12, wherein said passive recuperation system comprises a vertical air-liquid separator panel mounted on said support frame and including a grating positioned such as to intercept at least part of the treatment product present in said overspray while allowing air present in said overspray to pass through said separator panel, said part of said treatment product being collected at a bottom end of said grating.

14. A spraying apparatus as defined in claim 13, wherein said grating comprises a number of spaced profiled sheets disposed side-by-side.

15. A spraying apparatus as defined in claim 13, wherein there is provided at least one auxiliary panel section disposed adjacent to said separator panel and angularly adjustable with respect thereto for a wider recovery surface.

16. A spraying apparatus as defined in claim 13, wherein said passive recuperation system further comprises a channel at said bottom end of said grating and a recuperation reservoir for respectively collecting and storing said part of the treatment product intercepted by said grating.

17. A spraying apparatus as defined in claim 16, wherein said spray system comprises a main reservoir containing the treatment product and a pump mounted on said proximal side, at least one spray nozzle, and tubing for conveying pumped treatment product from said main reservoir to said spray nozzle, wherein said part of the treatment product is conveyed to said spray system for recirculation thereof.

18. A spraying apparatus as defined in claim 16, wherein a support boom extends outwardly from said support frame for extending above the vegetation, said conduit including a first section in fluid communication with said fan, a second section extending outwardly from said first section and supported by said support boom, and a third manifold section extending downwardly from said second section and on said distal side of the vegetation, at least one outlet being defined substantially vertically along an inner side of said third manifold section and from which the air stream emerges.

19. A spraying apparatus as defined in claim 18, wherein said spray system comprises a wet boom extending downwardly along said third manifold section, said wet boom being provided with a number of spray nozzles located adjacent to said outlet such that the treatment product is discharged from said nozzles into the air stream on said distal side of the vegetation.

20. A spraying apparatus as defined in claim 19, wherein a positioning system is provided for rotating said third manifold section together with said wet boom about a substantially vertical axis for selectively adjusting the orientation of said outlet and said nozzles.

21. A spraying apparatus as defined in claim 12, wherein a wind barrier is provided on said support frame for diminishing a wind effect on the air stream and treatment product.

22. A spraying apparatus for applying a treatment product on vegetation, comprising a support frame, a fan mounted on said support frame and on a proximal side of the vegetation, a conduit mounted to said support frame and having an inlet and an outlet, said conduit being adapted to extend above the vegetation and to convey air by way of said fan from said inlet to said outlet thereof such that an air stream exiting from said outlet on a distal side of the vegetation is directed towards said support frame, a spray system adapted to inject a treatment product in the air stream, a treatment product recuperation system mounted at said proximal side, and a wind barrier mounted on said support frame for diminishing a wind effect on the air stream and treatment product and positioned to intercept at least part of said air stream exiting from said outlet of said conduit, whereby the treatment product and the air stream are discharged at said distal side and towards the vegetation with at least a large portion of overspray emerging from the vegetation on said proximal side being collected by said recuperation system.

23. A spraying apparatus as defined in claim 22, wherein said wind barrier comprises at least one of substantially vertical panel mounted behind said recuperation system.

24. A spraying apparatus for applying a treatment product on vegetation, comprising a support frame, a fan mounted on said support frame and on a proximal side of the vegetation, a conduit mounted to said support frame and having an inlet and an outlet, said conduit being adapted to extend above the vegetation and to convey air by way of said fan from said inlet to said outlet thereof such that an air stream exiting from said outlet on a distal side of the vegetation is directed towards said support frame, a spray system adapted to inject a treatment product in the air stream, said conduit comprising an overhead section extending outwardly from said support frame and adapted to extend above the vegetation and, on said distal side, a flexible manifold section extending downwardly from said overhead section and opposite the vegetation, said spray system comprising a boom extending adjacent said manifold section and capable of bending such that said manifold section and said boom are both capable of deflection upon encountering an obstacle, whereby the treatment product and the air stream are discharged at said distal side and towards the vegetation respectively from said boom and said manifold section.

25. A spraying apparatus as defined in claim 24, wherein said conduit further comprises an inlet section enclosing said fan, a first elbow section connecting said inlet section to an upstream end of said overhead section and a second elbow section connecting a downstream end of said overhead section to said manifold section, said elbow sections each comprising flexible guiding vanes for reducing pressure losses.

26. A spraying apparatus as defined in claim 25, wherein said inlet, first and second elbow, overhead and manifold sections of said conduit are connected together with detachable means.

27. A spraying apparatus as defined in claim 26, wherein said detachable means comprise loop-and-hook fasteners.

* * * * *

UNITED STATES PATENT AND TRADEMARK OFFICE
CERTIFICATE OF CORRECTION

| | | |
|---|---|---|
| PATENT NO. | : 6,302,332 B1 | Page 1 of 1 |
| APPLICATION NO. | : 09/465706 | |
| DATED | : October 16, 2001 | |
| INVENTOR(S) | : Bernard Panneton, Roger Theriault and Benoit Lacasse | |

It is certified that error appears in the above-identified patent and that said Letters Patent is hereby corrected as shown below:

Item (73) Assignee should read: --Her Majesty the Queen in Right of Canada, as Represented by the Minister of Agriculture and Agri-Food; Université Laval, Office of Technology Transfer, Vice-Rectorate Research--

Signed and Sealed this

Twelfth Day of May, 2009

JOHN DOLL
*Acting Director of the United States Patent and Trademark Office*